J. AND P. A. SALAZAR.
DIFFERENTIAL MECHANISM FOR MOTOR VEHICLES.
APPLICATION FILED JUNE 25, 1920.

1,406,584.

Patented Feb. 14, 1922.

Inventors
Juan A. Salazar and
Perfecto A. Salazar
By Frank Feller
Attorney.

UNITED STATES PATENT OFFICE.

JUAN SALAZAR AND PERFECTO A. SALAZAR, OF PICACHO, ARIZONA.

DIFFERENTIAL MECHANISM FOR MOTOR VEHICLES.

1,406,584.	Specification of Letters Patent.	Patented Feb. 14, 1922.

Application filed June 25, 1920. Serial No. 391,694.

*To all whom it may concern:*

Be it known that we, JUAN SALAZAR and PERFECTO A. SALAZAR, citizens of the United States, residing at Picacho, in the county of Pinal and State of Arizona, have invented certain new and useful Improvements in Differential Mechanisms for Motor Vehicles, of which the following is a specification.

Our invention relates to a differential or driving mechanism for motor vehicles.

The main object is to provide an improved efficient means to permit one wheel of an axle to move relatively to and independently of the other wheel when turning to avoid the usual drag on the wheel which swings in the greater arc.

Another object is to provide such a means as may be protected from dust and upon the parts of which slight wear will occur.

Other objects as well as the advantages will appear from the description following, taken in connection with accompanying drawings illustrating one preferred embodiment.

In said drawings:—

Figure 1:
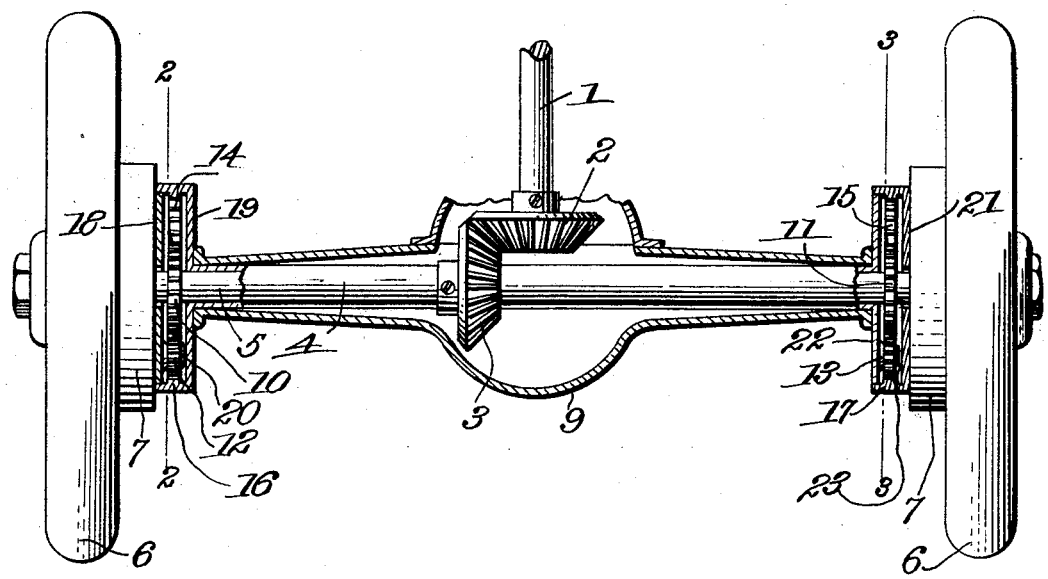
Fig. 1 is a plan view of vehicle wheels and our improved differential, with the casing of the latter shown in section to disclose details.
Figure 3:
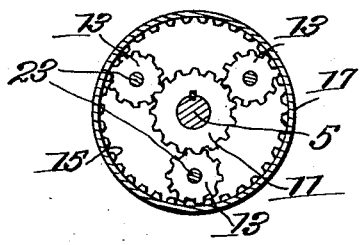
Fig. 3 is a cross-sectional view on the line 3—3 of Fig. 1.
Figure 2:
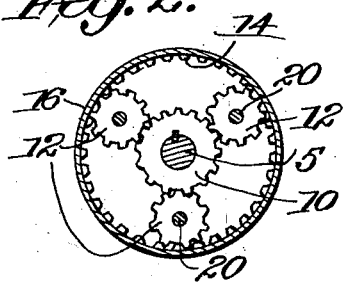
Fig. 2 is a cross-section on the line 2—2 of Fig. 1.

Referring specifically to the drawings wherein like reference characters designate like or corresponding parts, 1 designates the power or drive shaft of a motor vehicle, being driven from the engine thereof of course and upon which is fastened a bevel gear wheel 2 meshing with a bevel gear wheel 3 fastened to a sleeve or tubular shaft 4 journalled upon the rear axle of the vehicle 5 rotatably loose in wheels 6. Brake mechanism 7 is usually carried by the wheels. A suitable protecting casing for the working parts is provided at 9.

Axle 5 is provided with similar gear wheels 10 and 11 which mesh with intermediate gear wheels respectively designated 12 and 13 and which in turn respectively mesh with gear teeth 14 and 15 provided interiorly on annular walls or rims of drums 16 and 17. Drum 16 receives and revolves about a disk 18 which may be fastened to the adjacent mechanism 7 to rotate with the wheel 6. The flat wall of the drum as at 19 may be integral with tube 4 or rigidly fastened thereto. Gears 12 are journalled on stud shafts 20 carried by the disk 18. Drum 17 has its flat wall as at 21 fastened to the adjacent mechanism 7 to rotate with wheel 6 while a disk 22 is formed integral with or rigidly fastened to the tubular shaft 4, entering the drum 17 and the latter revolving thereon. Stud shafts 23 carried by disk 22 journal the gear wheels 13.

In use, when the wheels travel in a straight path, all of the parts described are turned as a solid mass, except the casing 9, from the shaft 1 through gear wheels 2 and 3. The gear wheels 10, 11, 12, 13 and rims 14 and 15 during this movement do not move relatively or independently of each other. But in turning curves, through the system of gearing used in the drums 16 and 17, one wheel may move relatively to and independently of and faster than the other in turning a curve. This overcomes dragging of the wheels and unnecessary wear and injury to the tires and undue strain on the vehicle engine.

Since merely the preferred embodiment of the invention has been illustrated and described, it is to be understood that changes in the details may be resorted to without departing from the spirit and scope.

We claim:—

1. In a differential mechanism, a shaft, a wheel member mounted thereon, a tubular shaft member journalled on the said shaft, means to drive the tubular shaft member, a drum mounted on one of said members and having gear teeth, means on said shaft to mesh with said teeth, and a disk on the other member extending into said drum.

2. In a differential mechanism, a shaft, wheels mounted thereon, a tubular shaft journalled on said shaft, means to drive the tubular shaft, a drum mounted on one of the wheels having gear teeth, means on the first shaft to mesh with said teeth, a disk on the tubular shaft extending into said drum, a second drum, said second drum being on said tubular shaft, a disk on one of the wheels extending into said second drum, said second drum having gear teeth, and gearing on the first shaft in mesh with the gear teeth of the second drum.

In testimony whereof we affix our signatures.

JUAN SALAZAR.
PERFECTO A. SALAZAR.